June 22, 1948.　　　　　J. G. SWIGART　　　　　2,443,750
ADDING MACHINE FOR COMPUTING BEARING ANGLES
Filed June 4, 1945　　　　　　　　　　　　　3 Sheets-Sheet 1

INVENTOR:
Jos^h G. Swigart

June 22, 1948.  J. G. SWIGART  2,443,750
ADDING MACHINE FOR COMPUTING BEARING ANGLES
Filed June 4, 1945   3 Sheets-Sheet 2

INVENTOR:
Jose G. Swigart

June 22, 1948.   J. G. SWIGART   2,443,750
ADDING MACHINE FOR COMPUTING BEARING ANGLES Filed June 4, 1945   3 Sheets-Sheet 3

INVENTOR:
Josef G. Swigart

Patented June 22, 1948

2,443,750

UNITED STATES PATENT OFFICE 2,443,750

ADDING MACHINE FOR COMPUTING BEARING ANGLES

Josef G. Swigart, Sheffield, Ill.

Application June 4, 1945, Serial No. 597,562

1 Claim. (Cl. 235—65)

My invention relates to improvements in adding machines used for the purpose of computing angular measurements in terms of degrees and parts of degrees together with the compass bearing.

It is well known that mathematical computations by hand of measurements expressed in degrees and its subdivisions are tedious, time-consuming and fraught with the factor of human error because the mind is more accustomed to working in the decimal system. A complete circle contains 360 units known as degrees, and the degree is in turn subdivided into 60 units known as minutes, with a further subdivision of the minute into 60 units known as seconds. For the purpose of expressing direction of a line in the art, the circle is divided into four quadrants of 90 degrees, and each quadrant bears a separate and distinct compass designation of northeast, southeast, southwest, or northwest respectively. The various methods used in the art to express a change of angularity and the necessity of determining the correct quadrant designation further complicate the calculations.

The present mechanical processes of computing angular measurements in terms of degrees and subdivisions thereof require exacting operations and the results are subject to limitations in accuracy.

The above disadvantages are inherent in the present means of calculating angular relationship.

It is, therefore, among the objects of the present invention to provide a mechanical means of adding angles rapidly and accurately with a minimum of operations.

Another object of the present invention is to provide a simple means of adding angles using any one or a combination of the systems used in the art of computing angular relationship.

Another object of the present invention is to provide a means of obtaining angular relationship rapidly, accurately and directly in degrees and subdivisions thereof simultaneously with the proper quadrant designation.

Another object of the present invention is to provide a means for computing angular relationship using degrees and minutes only, or for computing the more accurate relationship using degrees, minutes and seconds.

Objects and advantages other than those set forth will be apparent to those skilled in the art from the following descriptions when read in connection with the accompanying drawings, in which.

Similar numerals refer to similar parts throughout the several views.

Figure 4:
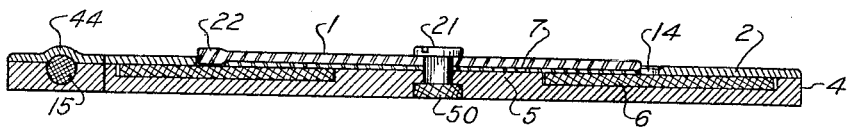
Fig. 4 is a vertical section of a part of the machine on line 4—4.

The cover frames 1 and 2, the spacers 3 and the rear housing member 4 (see Figs. 1 and 2) constitute the frame of the machine. The ring 6 rotates about the hub 5 and is prevented by friction from rotating freely. Shield 7 (Figs. 2 and 7) is fastened at its center by the shank of screw 21 and is held by friction from rotating between hub 5 and cover frame 1. Cover frame 1 (see Figs. 1 and 4) is fastened to the machine by screw 21 and nut 50. Slides 8, 9, 10 11, and 12 are snugly contained in the respective enclosures formed by spacers 3, cover frame 2 and rear housing member 4. Slides 8, 9, 10, 11, and 12 may be moved within the guide enclosures thus formed a distance equal to the difference between length of enclosure and length of slide, and are prevented by friction from free movement. The cover frame 2 and the rear housing member 4 are fastened together by a means such as screws 49 with nuts.

Figure 2:
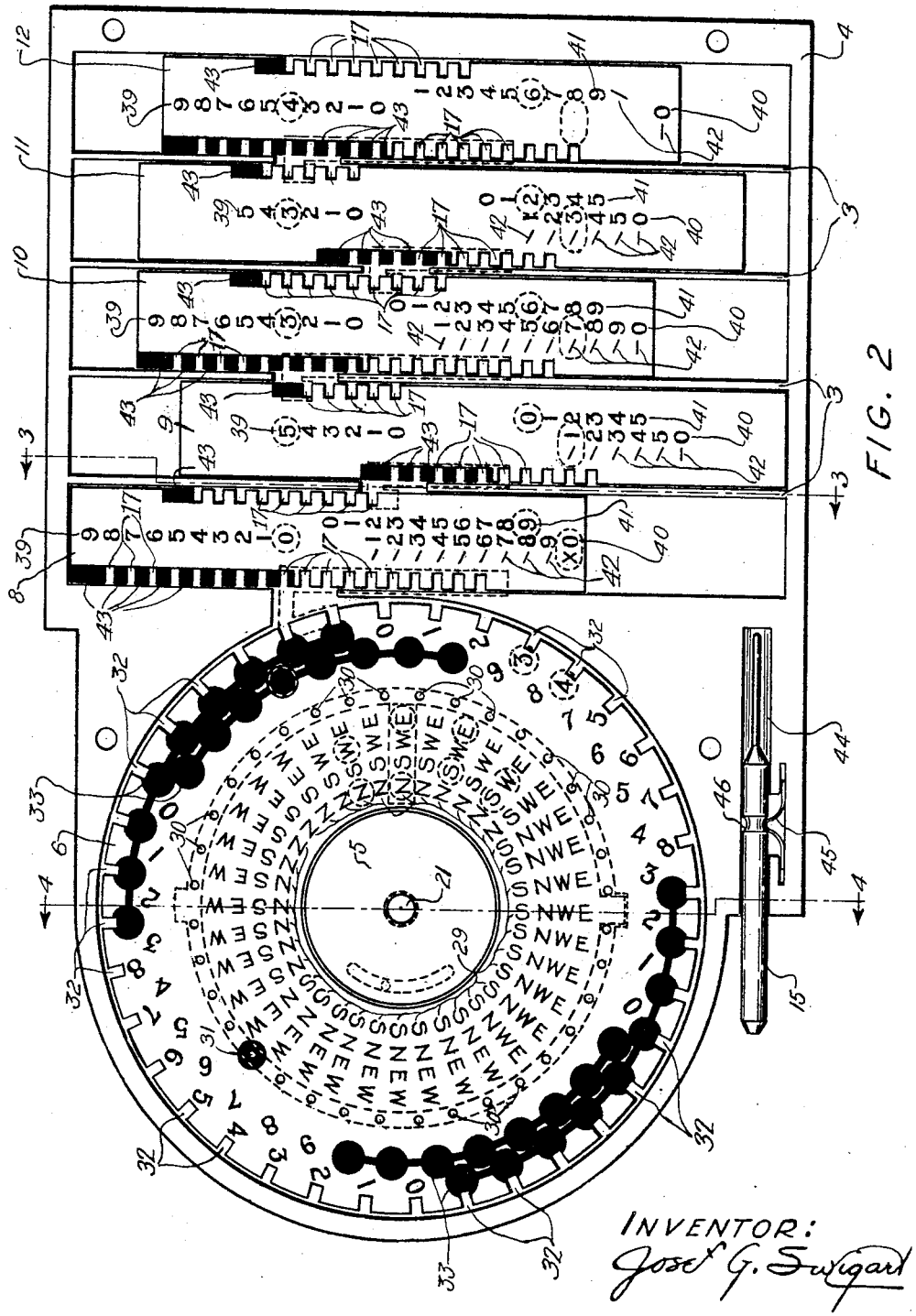
Fig. 2 illustrates in detailed plan view the interior of the machine with cover frame removed and showing the location of the pertinent outlines of elements of the cover frame and shield 7 in dotted lines.

Stylus 15 when not in use may be conveniently retained in the housing 44, held by means of leaf spring 45 engaged in recess 46 as shown in Fig. 2. Said stylus may be readily removed for use in operating the machine.

Figure 1:
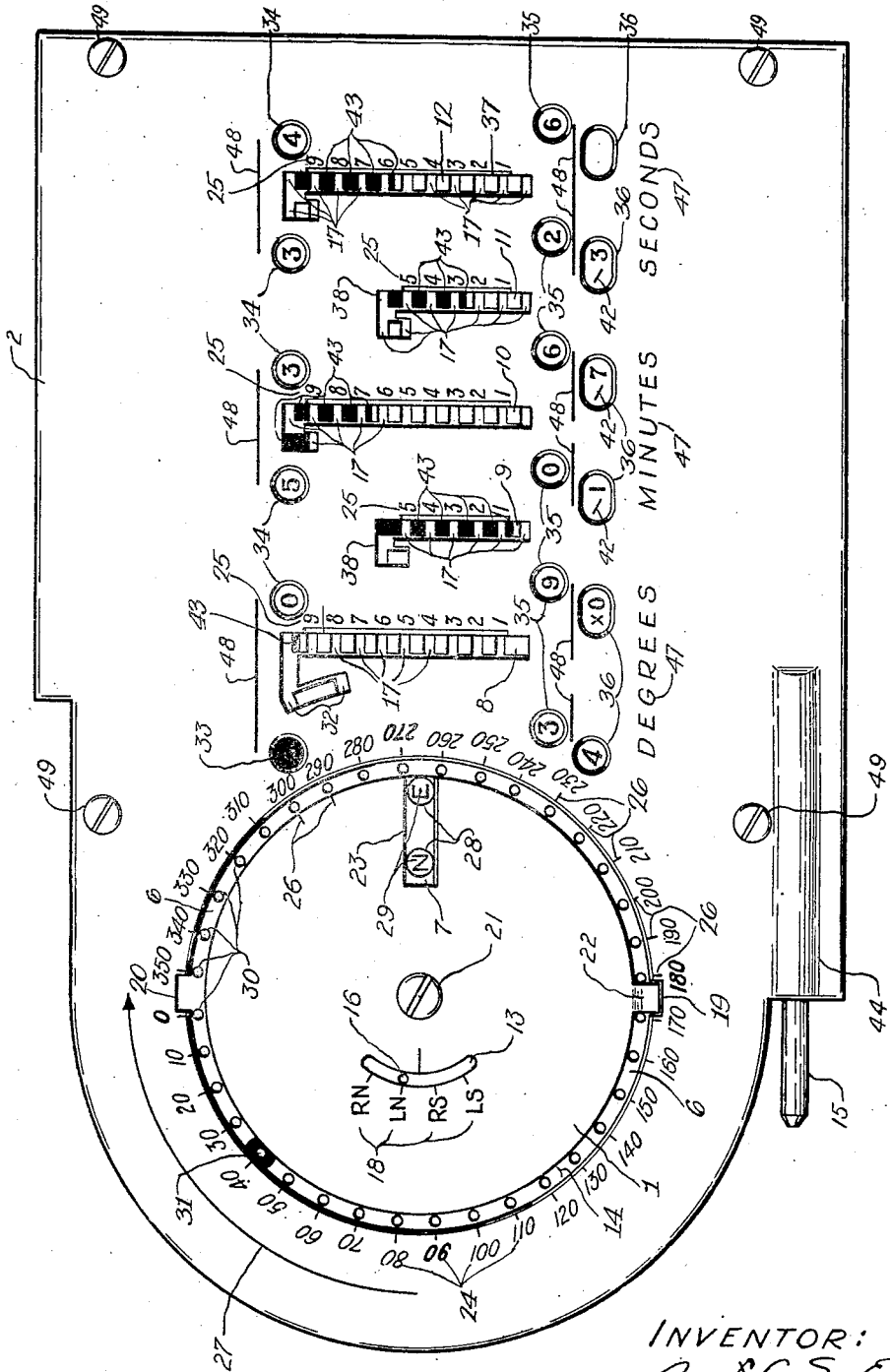
Fig. 1 is a plan view of the entire machine showing the general location relationships of the various elements of the cover frame.

Movement of ring 6 and of slides 8, 9, 10, 11, and 12 may be accomplished by engaging the stylus 15 in a notch 17, or in indent 30 or 31 or notch 32 in the case of ring 6, and applying force to the stylus to move a slide or ring in the direction and distance as limited by guide channels 14, 37, and 38 in frame 1 and 2 (see Figs. 1 and 2).

Figure 5:
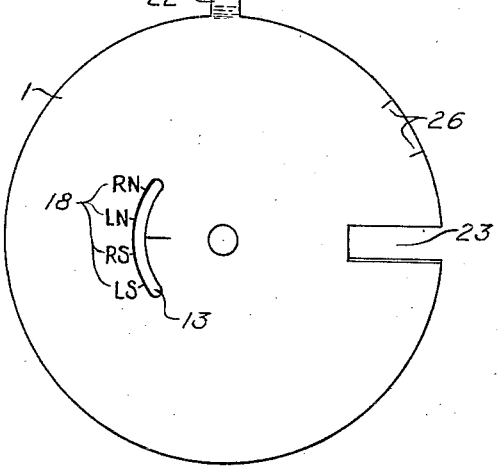
Fig. 5 is a plan view of the reverse side of cover frame 1.

Cover frame 1 may be installed in two positions; one position as shown in Fig. 1 with projection 22 engaged in indent 19, thus fixing the cover frame from rotating about its center, or another position with projection 22 engaged in indent 20. Reverse sides of cover frame 1 face outward in the two settings so that slots 13 and 23 maintain the same relative locations, as shown in Figs. 1 and 5. Projection 22 also serves as a stop-bar for the travel of the stylus when operating ring 6 through guide channel 14.

The various machine settings for calculations involving the different methods of measuring angularity may be obtained by securing projection 22 in notch 19 or in notch 20, and by moving indent 16 to a location opposite desired mark 18.

The marks 26 (thirty-six in number) are located as shown in Fig. 1 at ten-degree intervals with a numeral 24 indicating the respective degree of angularity opposite each mark 26.

Mark 27 serves the purpose of constant visual reminder for indicating the direction of rotation of ring 6 for all normal operations.

Figure 7:
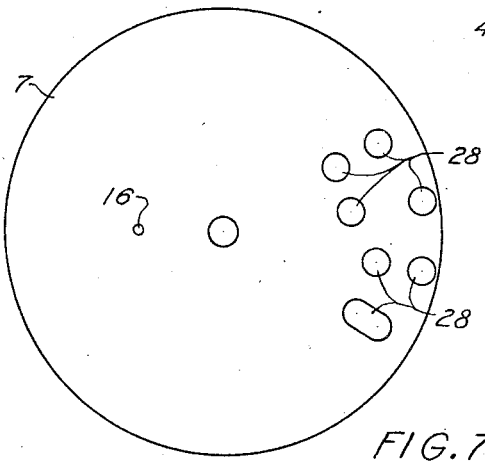
Fig. 7 is a plan view of shield 7.

View windows 28 arranged as shown in Fig. 7 reveal a definite pattern of alphabetic designations 29 on ring 6 (see Fig. 2) visible when within the boundaries of slot 23. The said alphabetic designations 29 refer to the four cardinal compass points of north, east, south and west.

The alphabetic and numeral characters, marks 33, indents 30 and 31 and notches 32 on ring 6 bear the grouping arrangements and location relationship between groupings as shown in Fig. 2. Indent 31 when placed adjacent to the "zero-degree" mark 26 locates the zero setting of ring 6; I prefer to carry out this feature of the invention by visually distinguishing indent 31 from indent 30 by bracketing said indent 31 with contrasting color as shown.

Marks 33 (as shown in Fig. 2) are visual aids in determining the row of view windows, windows 34 or a combination of windows 35 and 36, which contain the answer sought. When the mark 33 is visible in the corresponding view window 34, the answer may be obtained from a combination of view windows 35 and 36; or when a mark 33 is visible in either view window 35 or 36, the answer may be obtained from row of view windows 34 with one exception; the exception occurring when the "degree-reading" in view windows 34 varies between 90 and 99, and then only the reading of exactly 90 degrees should be obtained from said view windows 34. The remainder of the readings at this setting of ring 6 may be obtained from the rows of view windows 35 and 36. I prefer to use contrasting color to carry out the feature of marks 33.

The row of view windows 36 is an auxiliary to view windows 35; for this reason the answer (when view windows 34 are not to be used) will ordinarily be visible in view windows 35 only.

For convenience in obtaining an answer the row of view windows 34 may be read in the normal manner from left to right, but rows of view windows 35 and 36 should first be read from right to left. The guide marks 42 (as shown in Fig. 2) indicate the path to follow in reading the answer when starting from the extreme right position. The true answer is in reverse order of the reading obtained by following the path from right to left. Readings should be obtained from view windows 35 except when otherwise directed by marks 42; the windows thus by-passed are omitted.

Figure 6:
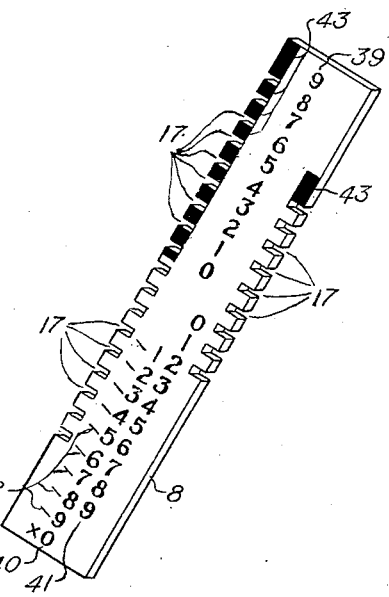
Fig. 6 is a view of slide 8 in perspective.

The view window 36 through which ring 6 is visible may be used only when all other view windows 36 show a "zero-reading," otherwise the corresponding view window 35 may be used; I prefer to use the "x" mark as shown on slide 8 (Figs. 2 and 6) to indicate that the use of said window depends upon the preceding path followed.

The guide channels 37 and 38 and the columns of numeral characters 25 are positioned as shown in Fig. 1. The vertical interval between centers of individual characters in columns 25 is uniform and equal to the interval between centers of notches 17 (see Fig. 2) in any row of notches on a slide, and equal to the interval between individual characters in any column of numeral characters 39, 40, and 41 on slides 8, 9, 10, 11, and 12. The indents 30 and 31, the numeral characters on ring 6, the compass designations 29, and marks 24 are positioned as shown, and are spaced at ten-degree intervals within any one concentric group.

When ring 6 or a slide 8, 9, 10, 11, and 12 is actuated by means of the stylus 15 inserted in a notch 17 or 32 or indent 30 or 31 and moved to the extremities of a guide channel 14, 37, or 38, the characters visible through the view windows 34, 35, and 36 and the slot 23 are centered therein.

A notch 17 bracketed by contrasting color 43 (see Figs. 2 and 6) indicates that the slide is to be moved in an upward direction to the upper limit of the respective channel, then the stylus is to be moved across the top of said channel engaging in a notch 17 or 32 of the slide to the left and then moved downward to the limit of the short leg of said channel; notches not so bracketed are to be moved downward to the lower limit of the respective guide channel. When a slide 8, 9, 10, 11, or 12 cannot be moved downward in the short leg of a channel 37 or 38, as indicated by the presence of the contrasting color 43, the stylus may be transferred to the next channel to the left and the respective slide moved upward the length of the channel, followed by the carry-over movement in the short leg of said channel.

Figure 3:
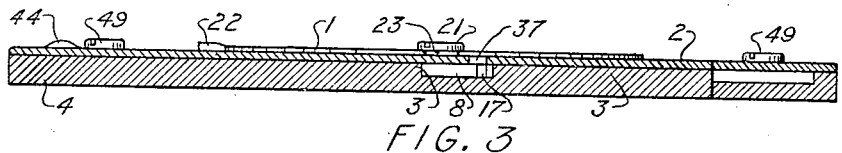
Fig. 3 is a vertical section of a part of the machine on line 3—3.

The gap in spacers 3 located at the point of intersection with guide channel 37 or 38 (see Figs. 1, 2 and 3) is to allow for uninterrupted travel of the stylus when used as described in the next preceding paragraph.

The words 47 and marks 48 as shown in Fig. 1 are so located to serve as visual reminders of the nature of the readings in the respective view windows.

For work in the art not involving the use of "seconds," slide 10 may be replaced by slide 12, being of the same width, and slides 10 and 11 may be made inoperative by inverting in place. Access to the slides may be had by parting the frame 2 and rear cover member 4 by removing the screws 49.

Over-all and successful operation of this machine may be accomplished by inserting the stylus in a notch of the proper slide in line with the numeral desired and moving the slide to completion in the direction indicated.

The manner in which the device is to be used is as follows: For one example, let it be assumed that a line of survey was run in the field in which the back-angle method was employed, and with all angles having been turned from the rear-sight to the fore-sight in a right-hand direction. Let us assume, that from this survey the initial bearing was N23°47′E. Since this example, for simplification, does not involve the use of "seconds" as is the case in all but extremely accurate surveys, the slides should be arranged as described previously when "seconds" are not to be used.

It is then necessary to fix projection 22 in indent 19; this location of projection 22 being correct for the solution of all problems involving the back-angle method of surveying. All angles having been turned to the right, it is necessary to move indent 16, by means of the stylus, to a position beside mark 18 of "RN" or "RS"; the initial-designation "R" indicating "right," and the "N" and "S" indicating north and south respectively. In this example the "N" and "S" have no particular consequence. The device is now ready for work. First, the initial bearing of N23°47'E must be set in the apparatus. Ring 6 is to be rotated until the numeral 2 appears in either of the left-hand view windows 34 or 35 and the alphabetic characters NE appear through view windows 28. Next, the slide 8 is to be moved until the numeral 3 appears in the same horizontal row of view windows as the numeral 2. Next, the slide 9 is to be moved until the numeral 4 appears, followed by moving slide 12 (slide 12 being in a position adjacent to slide 9 for this example) until the numeral 7 appears; both numerals 4 and 7 appearing in the same horizontal row as the numerals 2 and 3. The initial bearing and angle is now completely set in the apparatus. Let it be assumed that the first angle turned was right 145°08'. The whole-degree reading is 145 (read as "one hundred forty-five") and since the largest full ten-degree total is 140, the stylus is inserted in the indent 30 or 31, whichever corresponds to the mark 24 of "140" at the time, and the ring 6 is moved in the direction indicated by mark 27 until the stylus is stopped from further travel by the fixed position of projection 22. The decimal part of a full ten-degree increment, 5 in this example, is set in the apparatus by inserting the stylus in the notch of slide 8 which corresponds to the numeral 5 in the column of numeral characters 25 adjacent to the corresponding guide channel 37, and then by moving the slide 8 in the direction indicated. Thus the 145° has been introduced. The "minute" reading of the angle being "08" (read "zero eight") there is no full ten-minute increment, hence slide 9 is not moved for the introduction of the "zero." The decimal part of a full ten-minute increment, 8 in this example, is introduced in the apparatus by inserting the stylus in the notch of slide 12 corresponding to the numeral 8 in the column of numeral characters adjacent to the corresponding guide channel, and the by moving the slide 12 in the direction indicated. The entire angle of deflection of 145°08' is now introduced. The result, N11°05'W is now visible in the view windows; the direction "NW" appearing in windows 28 and the angularity in one of the horizontal rows of view windows 34, or 35 and 36; the correct row being determined by the location of mark 33. In similar manner each succeeding deflection angle is introduced with the resultant bearing appearing.

When the back-angle method of surveying is used with deflection angles turned to the left, the only difference in procedure is to move indent 16 to a position corresponding to mark 18 of "LN" or "LS." Should the surveying procedure involve the back-angle method but with varying direction of angular deflection, either to the right or to the left, the indent 16 must be moved each time to a mark 18 which corresponds to the particular direction of deflection. This latter surveying procedure is uncommon.

Another variation of surveying methods is that of back-sighting on the rear-sight and then plunging the transit telescope vertically about its horizontal axis. The angle from this 180°-reversed position of the transit telescope to the fore-sight becomes the recorded deflection angle. In applying this method of surveying to obtain results with my device, the only difference from the back-angle procedure is in the location of projection 22, which must be mated in indent 20 in this case. The method for introducing the initial bearing and of subsequent deflection angles is the same as described in the back-angle method.

Another application for my device is in solving for the direction of each of several points from a fixed point. In the field, the method of surveying may involve the use of a fixed north-south base, or reference, line running out from the fixed point. The deflection angle thus becomes the angle between the reference line and a radial line running to a point, the bearing of which is desired. To obtain the bearing angles from the given deflection angles with my device, let it be assumed for example that all deflections were to the right from a reference line running north from the fixed point. The projection 22 must be mated in indent 20, and indent 16 must be moved to a position corresponding to mark 18 of "RN" which indicates angles turned to the right from the north. Before introducing a deflection angle in the apparatus, the indent 31 must be moved to the "zero-degree" mark 26, and all slides to be used (as determined by the use of degrees, minutes, and seconds, or of degrees and minutes only) must be positioned to reveal "zero" readings in the row of view windows 34. A deflection angle may now be introduced and subsequent result obtained in the manner described previously, but followed each time by returning the ring and slides to the initial position.

If the field-survey method involves a base line running south from the turning point with all deflection angles turned to the right, the only difference from the example immediately preceding is in moving indent 16 to a position corresponding to the mark 18 of "RS" before introducing a deflection angle. If yet another field-survey method involves the use of deflections turned variably to the right or to the left from the base line, the indent 16 must be moved each time to a mark 18 which corresponds to the particular direction of deflection and base line. Normally the base line remains a constant, so the setting of indent 16 would involve changes between marks 18 of "RN" or "LN," or of "RS" or "LS" for any one set of deflection angles.

Should a method of survey involve a base line of known bearing which is neither due north or due south, the exact direction and deflection of the base line must be set in the apparatus before introducing each deflection angle. In this example, only the R and L designations of mark 18 would be of consequence.

In all computations, the initial bearing angle (reference line) to be set in the device must be placed in the row of view windows 34, or 35 and 36 which will reveal the bearing of the reference line through windows 28 simultaneously with indent 16 positioned with a mark 18 of "R" or "L" whichever corresponds to the direction of the deflection angle to be added to the initial bearing angle.

In computations involving the use of "seconds," slide 11 is employed for the addition of full ten-second increments, and slide 12 for the addition of the decimal part of a full ten-second increment.

I am aware that prior to my invention adding machines for decimal system computations using the notched-slide, channel, stylus combination have been made. I therefore do not claim such a combination broadly; but I claim:

A calculating device for obtaining directly bearing angle and direction thereof consisting of a circular cover section having a radial projection from a portion thereof, having a radial slit in a portion of the periphery thereof, having an opening in another portion thereof having alphabetic characters adjacent said opening and having similar alphabetic characters adjacent said opening on the opposite face of said cover section in reverse upright position with respect to said radial projection; a shield member positioned adjacent said cover section having a plurality of display openings in a portion thereof through which alphabetic characters on a ring member register, and having an indentation for positioning of said shield member in another portion thereof, said indentation registering through said opening in said cover section; a ring member positioned concentrically with and under said cover section having a plurality of equally spaced radial slits along the periphery thereof, having a plurality of indentations equally spaced and concentrically located in a portion of the surface thereof, having a concentric pattern of numerals and contrasting color markings on another portion of the surface thereof, and having a concentric pattern of alphabetic characters on another portion of the surface thereof; a plurality of slide members each having a plurality of equally spaced slits in the edges thereof, each having a plurality of columns of numerals on the surface thereof, each having guide markings on the surface thereof, and each having a pattern of contrasting color markings on another portion of the surface thereof; said ring member and slide members being maintained in space relationship in an enclosure case, said enclosure case having an opening concentric with but larger than aforementioned circular shield forming an operating slot through which said indentations in said ring member register and having slits in said opening for engagement of the projection on said circular cover section, said opening having a plurality of equally spaced markings and numerals to correspond adjacent thereto, said case having a plurality of display openings through which said numerals and contrasting color markings on said ring member register and other display openings through which said numerals and guide markings on said slide members register, said case having a plurality of openings forming slide operating slots through which the slits in said slide members register, one opening through which the slits in said ring member register, and having numerals adjacent said openings on the surface of said enclosure case; said ring member being rotatable about its center and said slide members being moveable in a path paralleling the edges having slits therein; said ring member and slide members each being operable separably within said enclosure case, and said cover section being invertible.

JOSEF G. SWIGART.

REFERENCES CITED

The following references are of record in the file of this patent:

UNITED STATES PATENTS

| Number | Name | Date |
|---|---|---|
| 1,955,672 | Duran | Apr. 17, 1934 |
| 2,223,612 | Grundlehner | Dec. 3, 1940 |